(12) United States Patent
Tomovic et al.

(10) Patent No.: US 11,814,469 B2
(45) Date of Patent: Nov. 14, 2023

(54) POLYURETHANES HAVING LOW EMISSIONS OF ORGANIC COMPOUNDS

(71) Applicant: BASF SE, Ludwigshafen am Rhein (DE)

(72) Inventors: Zeljko Tomovic, Lemfoerde (DE); Sirus Zarbakhsh, Ludwigshafen (DE); Iran Otero Martinez, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 147 days.

(21) Appl. No.: 16/964,794

(22) PCT Filed: Jan. 23, 2019

(86) PCT No.: PCT/EP2019/051568
§ 371 (c)(1),
(2) Date: Jul. 24, 2020

(87) PCT Pub. No.: WO2019/149583
PCT Pub. Date: Aug. 8, 2019

(65) Prior Publication Data
US 2021/0054132 A1 Feb. 25, 2021

(30) Foreign Application Priority Data
Feb. 2, 2018 (EP) ...................................... 8154960

(51) Int. Cl.
| | | |
|---|---|---|
| *C08G 18/76* | (2006.01) | |
| *C08G 18/32* | (2006.01) | |
| *C08G 18/40* | (2006.01) | |
| *C08G 18/42* | (2006.01) | |
| *C08G 18/48* | (2006.01) | |
| *C08G 18/72* | (2006.01) | |
| *C08G 18/79* | (2006.01) | |
| *C08G 18/18* | (2006.01) | |
| *C08G 101/00* | (2006.01) | |

(52) U.S. Cl.
CPC ..... *C08G 18/7664* (2013.01); *C08G 18/1808* (2013.01); *C08G 18/3281* (2013.01); *C08G 18/4018* (2013.01); *C08G 18/4238* (2013.01); *C08G 18/4241* (2013.01); *C08G 18/485* (2013.01); *C08G 18/4808* (2013.01); *C08G 18/4825* (2013.01); *C08G 18/72* (2013.01); *C08G 18/724* (2013.01); *C08G 18/797* (2013.01); *C08G 2101/00* (2013.01); *C08G 2110/0083* (2021.01)

(58) Field of Classification Search
CPC ............ C08G 18/7664; C08G 18/3281; C08G 18/4018; C08G 18/4241; C08G 18/4808; C08G 18/4825; C08G 18/485; C08G 18/724; C08G 18/797; C08G 2110/0083; C08G 18/4238; C08G 18/1808; C08G 18/72; C08G 2101/00
See application file for complete search history.

(56) References Cited

U.S. PATENT DOCUMENTS

| 4,006,122 | A | | 2/1977 | Chen et al. | |
|---|---|---|---|---|---|
| 4,451,583 | A | * | 5/1984 | Chesler | .................. C08J 9/0061 521/49 |
| 4,681,903 | A | | 7/1987 | Haas et al. | |
| 4,792,575 | A | * | 12/1988 | Takao | .................... C08G 18/10 521/157 |
| 2004/0242867 | A1 | | 12/2004 | Baudin et al. | |
| 2006/0141236 | A1 | | 6/2006 | Nakamura et al. | |
| 2013/0203880 | A1 | | 8/2013 | George et al. | |
| 2016/0304686 | A1 | | 10/2016 | Otero Martinez et al. | |
| 2018/0155487 | A1 | | 6/2018 | Otero Martinez et al. | |
| 2019/0119460 | A1 | | 4/2019 | Tomovic et al. | |

FOREIGN PATENT DOCUMENTS

| EP | 1428847 A1 | 6/2004 |
|---|---|---|
| WO | 2015082316 A1 | 6/2015 |
| WO | 2016188675 A1 | 12/2016 |
| WO | 2017207687 A1 | 12/2017 |

OTHER PUBLICATIONS

European Search Report for EP Patent Application No. 18154960.1, dated Sep. 7, 2018, 3 pages.
International Search Report for corresponding PCT/EP2019/051568 dated Mar. 25, 2019, 2 pages.

* cited by examiner

*Primary Examiner* — Rabon A Sergent
(74) *Attorney, Agent, or Firm* — Armstrong Teasdale LLP

(57) ABSTRACT

The present disclosure relates to a process for producing polyurethanes including mixing (a) polyisocyanate, (b) polymeric compounds having isocyanate-reactive groups, (c) catalysts and optionally (d) blowing agents, (e) chain-extending and/or crosslinking agents and (f) auxiliaries and/or additives to afford a reaction mixture and reacting the reaction mixture to afford polyurethane. The polymeric compounds having isocyanate-reactive groups (b) are a polyesterol (b1) obtainable by polycondensation of an acid component with an alcohol component. The acid component includes malonic acid and/or derivatives thereof and the alcohol component includes an aliphatic dialcohol having 4 to 12 carbon atoms. The present disclosure further relates to a polyurethane obtainable by such a process and to a method of using in enclosed spaces.

12 Claims, No Drawings

POLYURETHANES HAVING LOW EMISSIONS OF ORGANIC COMPOUNDS

CROSS-REFERENCE TO RELATED APPLICATIONS

This application is a U.S. National Phase Application of PCT/EP2019/051568, filed on Jan. 23, 2019, which claims the benefit of priority to European Patent Application Number 18154960.1, filed Feb. 2, 2018, the entire contents of which are hereby incorporated by reference herein.

The present invention relates to a process for producing polyurethanes comprising mixing (a) polyisocyanate, (b) polymeric compounds having isocyanate-reactive groups, (c) catalysts and optionally (d) blowing agents, (e) chain-extending and/or crosslinking agents and (f) auxiliaries and/or additives to afford a reaction mixture and reacting the reaction mixture to afford polyurethane, wherein the polymeric compounds (b) a polyesterol (b1) obtainable by polycondensation of an acid component with an alcohol component, wherein the acid component comprises malonic acid and/or derivatives thereof and the alcohol component comprises an aliphatic dialcohol having 4 to 12 carbon atoms. The present invention further relates to a polyurethane obtainable by such a process and to the use in enclosed spaces, for example in the interior of means of transport.

Polyurethanes have numerous applications, for example in the furniture industry as seat cushioning or as a binder for particle board, as an insulation material in the construction industry, as an insulation material, for example of pipes, hot water storage tanks or refrigerators, and as trim pieces, for example in automotive manufacture. Polyurethanes are often employed in particular in automobile manufacturing, for example in automobile exterior trim as spoilers, roof elements, suspension elements and in automobile interior trim as headliners, foam carpet backings, door trims, steering wheels, gear knobs and seat cushioning.

It is known that polyurethanes have a propensity for emitting organic substances which can cause unpleasant odors or, in the case of high concentrations, unwellness. Enclosed spaces, for example in the interior of buildings or vehicles, for example automobiles, are particularly affected. One example of such emissions is the emission of aldehydes. Different approaches for reducing aldehyde emissions are already in existence.

Thus for example EP 1428847 describes that aldehyde emissions may be reduced by subsequent addition of polymeric substances having primary and/or secondary amino groups. The amine groups in the polymer are responsible for the reduction in emissions. Since these are isocyanate-reactive and are very largely deactivated by reaction with the isocyanate the polymeric active substance should be applied to the previously produced foam. Disadvantageous here is a cumbersome process comprising an additional step of aftertreatment of the foam. Use in compact systems or closed-cell foams is not possible.

US 20130203880 describes the use of polyhydrazodicarbonamide as a substance for reducing aldehyde emissions in polyurethane foams. However, a marked reduction in aldehydes is only achieved upon addition of a large amount of polyhydrazodicarbonamide of 2% to 5.5% by weight in the polyol component. Since polyhydrazodicarbonamide likewise has catalytic properties the addition of this substance on this scale alters the reaction profile. Furthermore, the aldehyde reduction achieved is in need of further improvement even when large amounts of polyhydrazodicarbonamide are employed.

US 2006/0141236 describes the use of hydrazine compounds in polyurethanes as aldehyde scavengers. The active substance is added directly to the polyol component. The examples describe the use of acethydrazide, carbohydrazide and adipic dihydrazide. This achieves reductions in aldehyde emissions of 60% to 70%.

WO 2015082316 describes the use of CH-acidic compounds of general formula $R^1$—$CH_2$—$R^2$, wherein $R^1$ and $R^2$ independently of one another represent an electron-withdrawing radical, for reducing formaldehyde emissions in combination with incorporable catalysts. This can efficiently reduce formaldehyde but the foam specimens still exhibit high emissions of volatile organic substances, thus leading to high TVOC values according to VDA 277.

WO 2016188675 describes the use of CH-acidic substances, for example compounds obtainable by esterification of polyetherols with methyl acetoacetate. Here too, the emission of formaldehyde can be efficiently reduced but high emissions of other organic compounds (for example high TVOC values according to VDA 277) remain, especially at relatively high temperatures such as are achieved for example in the production of the foams.

WO 2017207687 describes the use of malonic hydrazides for reducing emissions of organic substances. Disadvantages of these substances are that they are only sparingly soluble and cannot be completely dissolved in commonly used polyol components, and the high cost of these compounds.

It was an object of the present invention to provide polyurethanes, in particular polyurethane foams, which exhibit a reduced emission of organic substances, such as aldehydes, in particular formaldehyde and acetaldehyde. In particular, the substances responsible for the reduced aldehyde emission should have a long-lasting effectiveness and should not lead to any additional emissions of the polyurethane. Furthermore, the low-emission polyurethane foams should be producible by a simple process in which it is possible to add the substances responsible for reducing the aldehyde emissions directly to the reaction mixture for producing the polyurethane. In particular, inexpensive and easily handleable substances that do not impair the production of the polyurethanes should be used.

The object of the invention is achieved by a process for producing polyurethanes comprising mixing (a) polyisocyanate, (b) polymeric compounds having isocyanate-reactive groups, (c) catalysts and optionally (d) blowing agents, (e) chain-extending and/or crosslinking agents and (f) auxiliaries and/or additives to afford a reaction mixture and reacting the reaction mixture to afford polyurethane, wherein the polymeric compounds (b) a polyesterol (b1) obtainable by polycondensation of an acid component with an alcohol component, wherein the acid component comprises malonic acid and/or derivatives thereof and the alcohol component comprises an aliphatic dialcohol having 4 to 12 carbon atoms. Furthermore, the object of the invention is achieved by a polyurethane obtainable by a process according to the invention. The present invention further provides for the use of the polyurethane according to the invention in enclosed spaces, for example in means of transport.

"Polyurethane" in the context of the invention comprises all known polyisocyanate polyaddition products. These comprise addition products of isocyanate and alcohol and modified polyurethanes which may comprise isocyanurate, allophanate, urea, carbodiimide, uretonimine and biuret structures and further isocyanate addition products. These polyurethanes according to the invention comprise in particular solid polyisocyanate polyaddition products, such as duromers, and foams based on polyisocyanate-polyaddition products, such as flexible foams, semi-rigid foams, rigid foams or integral foams and also polyurethane coatings and binders. "Polyurethanes" are further to be understood as meaning polymer blends comprising polyurethanes and further polymers, and also foams made of these polymer blends. The polyurethanes according to the invention are preferably polyurethane foams or solid polyurethanes which comprise no further polymers in addition to the polyurethane units (a) to (f) elucidated hereinbelow.

In the context of the invention "polyurethane foams" are to be understood as meaning foams according to DIN 7726. Flexible polyurethane foams according to the invention have a compressive stress at 10% compression/compressive strength according to DIN 53 421/DIN EN ISO 604 of 15 kPa or less, preferably 1 to 14 kPa and in particular 4 to 14 kPa. Semi-rigid polyurethane foams according to the invention have a compressive stress at 10% compression according to DIN 53 421/DIN EN ISO 604 of more than 15 to less than 80 kPa. According to DIN ISO 4590 semi-rigid polyurethane foams and flexible polyurethane foams according to the invention have an open-cell content of preferably more than 85%, particularly preferably more than 90%. Further details about flexible polyurethane foams and semi-rigid polyurethane foams according to the invention may be found in "Kunststoffhandbuch", Volume 7, "Polyurethane", Carl Hanser Verlag, 3rd edition 1993, chapter 5.

The rigid polyurethane foams according to the invention exhibit a compressive stress at 10% compression of not less than 80 kPa, preferably not less than 120 kPa, particularly preferably not less than 150 kPa. Furthermore, the rigid polyurethane foam has a closed-cell content of more than 80%, preferably more than 90%, according to DIN ISO 4590. Further details about rigid polyurethane foams according to the invention may be found in "Kunststoffhandbuch", Volume 7, "Polyurethane", Carl Hanser Verlag, 3rd edition 1993, chapter 6.

In the context of the present invention "elastomeric polyurethane foams" is to be understood as meaning polyurethane foams according to DIN 7726 which after brief deformation by 50% of their thickness according to DIN 53 577 show no lasting deformation above 2% of their starting thickness after 10 minutes. A rigid polyurethane foam, a semi-rigid polyurethane foam or a flexible polyurethane foam may be concerned.

"Integral polyurethane foams" is to be understood as meaning polyurethane foams according to DIN 7726 having an edge zone that has a higher density than the core as a consequence of the molding process. The overall apparent density averaged over the core and the edge zone is preferably more than 100 g/L. In the context of the present invention integral polyurethane foams may also be rigid polyurethane foams, semi-rigid polyurethane foams or flexible polyurethane foams. Further details about integral polyurethane foams according to the invention may be found in "Kunststoffhandbuch", Volume 7, "Polyurethane", Carl Hanser Verlag, 3rd edition 1993, chapter 7.

Polyurethanes according to the invention are obtained by mixing polyisocyanates (a), polymeric compounds having isocyanate-reactive groups (b), catalysts (c) and optionally blowing agents (d), chain-extending and/or crosslinking agents (f) and auxiliaries and/or additives (f) to afford a reaction mixture and reacting the reaction mixture to afford polyurethane, wherein the polymeric compounds (b) a polyesterol (b1) obtainable by polycondensation of an acid component with an alcohol component, wherein the acid component comprises malonic acid and/or derivatives thereof and the alcohol component comprises an aliphatic dialcohol having 4 to 12 carbon atoms.

In a preferred embodiment the polyurethane according to the invention is a polyurethane foam having an average density of 10 to 850 g/L, preferably a semi-rigid polyurethane foam or a flexible polyurethane foam or a rigid polyurethane foam, particularly preferably an elastomeric flexible polyurethane foam, a semi-rigid polyurethane foam or an elastomeric integral polyurethane foam. The elastomeric integral polyurethane foam preferably has a density averaged over the core and the edge zone of 150 g/L to 500 g/L. The flexible polyurethane foam preferably has an average density of 10 to 100 g/L. The semi-rigid polyurethane foam preferably has an average density of 70 to 180 g/L.

In a further preferred embodiment the polyurethane is a solid polyurethane having a density of preferably more than 850 g/L, preferably 900 g/L to 1400 g/L and particularly preferably 1000 g/L to 1300 g/L. A solid polyurethane is obtained without addition of a blowing agent. Small amounts of blowing agent, for example water, present in the polyols as a consequence of production are not to be understood in the present invention as constituting blowing agent addition. The reaction mixture for producing the compact polyurethane preferably comprises less than 0.2% by weight, particularly preferably less than 0.1% by weight and in particular less than 0.05% by weight, of water.

The polyurethane according to the invention is preferably employed in the interior of means of transport, such as ships, airplanes, lorries, passenger cars or buses, particularly preferably passenger cars or buses and especially passenger cars. The interior of passenger cars and buses hereinbelow is referred to as an automotive interior part. A flexible polyurethane foam can be used as a seat cushion, a semi-rigid polyurethane foam as back-foaming for door trim elements or instrument panels, an integral polyurethane foam as a steering wheel, shift knob or headrest and a solid polyurethane as a cable sheathing for example.

The polyisocyanates (a) used for producing the polyurethanes according to the invention comprise all polyisocyanates known for the production of polyurethanes. These comprise the aliphatic, cycloaliphatic and aromatic divalent or polyvalent isocyanates known from the prior art and any desired mixtures thereof. Examples include 2,2'-, 2,4'- and 4,4'-diphenylmethane diisocyanate, the mixtures of monomeric diphenylmethane diisocyanates and higher nuclear homologous of diphenylmethane diisocyanate (polymeric MDI), isophorone diisocyanate (IPDI) or its oligomers, 2,4- or 2,6-tolylene diisocyanate (TDI) or mixtures thereof, tetramethylene diisocyanate or its oligomers, hexamethylene diisocyanate (HDI) or its oligomers, naphthylene diisocyanate (NDI) or mixtures thereof.

Preference is given to 2,4- and/or 2,6-tolylene diisocyanate (TDI) or mixtures thereof, monomeric diphenylmethane diisocyanates and/or higher nuclear homologous of diphenylmethane diisocyanate (polymeric MDI) and mixtures thereof. Further possible isocyanates are recited for example in "Kunststoffhandbuch", Volume 7, "Polyurethane", Carl Hanser Verlag, 3rd edition 1993, chapters 3.2 and 3.3.2.

The polyisocyanates (a) may be employed in the form of polyisocyanate prepolymers. These polyisocyanate prepolymers are obtainable by reacting an excess of the above-described polyisocyanates (constituent (a-1)) with polymeric compounds having isocyanate-reactive groups (b) (constituent (a-2)) and/or chain extenders (c) (constituent (a-3)) for example at temperatures of 20° C. to 100° C., preferably at about 80° C., to afford the isocyanate prepolymer.

Polymeric compounds having isocyanate-reactive groups (a-2) and chain extenders (a-3) are known to those skilled in the art and described for example in "Kunststoffhandbuch [Plastics Handbook], volume 7, Polyurethane [Polyurethanes]", Carl Hanser Verlag, 3rd edition 1993, chapter 3.1. Thus also employable for example as polymeric compounds having isocyanate-reactive groups (a-2) are the polymeric compounds having isocyanate-reactive groups described below under (b). In a preferred embodiment the polymeric compounds having isocyanate-reactive groups employed as constituent (a2) comprise the polyesterol (b1), and it is also possible to employ the entire usage amount of the polyesterol (b1) to produce the prepolymer. If an isocyanate prepolymer is employed as isocyanate (a) this preferably has an isocyanate content (NCO content) of more than 5%, more preferably 10% to 50%, yet more preferably 15% to 40%, particularly preferably 17% to 35% and especially 20% to 30% by weight.

Employable polymeric compounds having isocyanate-reactive groups (b) include all known compounds having at least two isocyanate-reactive hydrogen atoms, for example those having a functionality of 1 to 8 and a number-average molecular weight of 400 to 15,000 g/mol, wherein the average functionality averaged over all polymeric compounds having isocyanate-reactive groups is at least 2. It is accordingly possible for example to employ compounds selected from the group of polyether polyols, polyester polyols, also referred to as polyether polyol or polyether alcohols or polyester polyol or polyester alcohols, or mixtures thereof.

Polyether alcohols are for example produced from epoxides, such as propylene oxide and/or ethylene oxide, or from tetrahydrofuran with active-hydrogen starter compounds, such as aliphatic alcohols, phenols, amines, carboxylic acids, water or natural-based compounds, such as sucrose, sorbitol or mannitol, by using a catalyst. Suitable catalysts here include basic catalysts or double metal cyanide catalysts as described for example in PCT/EP2005/010124, EP 90444 or WO 05/090440.

Polyesterols are for example producible from an acid component comprising an aliphatic or aromatic dicarboxylic acid or derivatives thereof and an alcohol component comprising polyhydric alcohols, polythioether polyols, polyester amides, hydroxyl-containing polyacetals and/or hydroxyl-containing aliphatic polycarbonates, preferably in the presence of an esterification catalyst.

Other possible polyols are listed by way of example in "Kunststoffhandbuch, Band 7, Polyurethane" [Plastics Handbook, volume 7, Polyurethanes], Carl Hanser Verlag, 3rd edition 1993, chapter 3.1.

Also employable in addition to the described polyetherols and polyesterols are filler-containing polyetherols and polyesterols, also known as polymer polyetherols or polymer polyesterols. Such compounds preferably comprise dispersed particles of thermoplastics, for example constructed from olefinic monomers, such as acrylonitrile, styrene, (meth)acrylates, (meth)acrylic acid and/or acrylamide. Such filler-containing polyols are known and commercially available. Their production is described, for example, in DE 111 394, U.S. Pat. Nos. 3,304,273, 3,383,351, 3,523,093, DE 1,152,536, DE 1,152,537 WO 2008/055952 and WO2009/128279.

The polymeric compounds according to the invention having isocyanate-reactive groups (b) further comprise at least one polyesterol (b1) obtainable by polycondensation of an acid component with an alcohol component, wherein the acid component comprises malonic acid and/or derivatives thereof and the alcohol component comprises an aliphatic dialcohol having 4 to 12 carbon atoms.

The acid component comprises malonic acid or derivatives thereof. In the context of the present invention "acid derivatives" is to be understood as meaning all derivatives of the acid capable of reacting with alcohols to afford esters. Such derivatives comprise for example acid chlorides, acid anhydrides or esters, such as methyl or ethyl esters. In addition to malonic acid or derivatives thereof the acid component may comprise one or more further di- or polycarboxylic acids or derivatives thereof, preferably diacids having 2 to 12, preferably 6 to 12, carbon atoms. Preferred examples are succinic acid, glutaric acid, adipic acid, suberic acid, azelaic acid, sebacic acid, decanedicarboxylic acid, maleic acid, fumaric acid, phthalic acid, isophthalic acid and terephthalic acid. If the acid component comprises further di- or polycarboxylic acids or derivatives thereof in addition to malonic acid or derivatives thereof, these particularly preferably comprise aliphatic diacids or derivatives thereof and especially adipic acid. In a particularly preferred embodiment exclusively malonic acid and adipic acid, in each case optionally also in the form of derivatives thereof, are employed as the acid component.

The acid component preferably comprises 20 to 100 mol %, more preferably 60 to 100 mol % and in particular 80 to 100 mol % of malonic acid or derivatives thereof.

The alcohol component comprises aliphatic dialcohols having 4 to 12 carbon atoms, such as butanediol, pentanediol, hexanediol or decanediol, preferably pentanediol and/or hexanediol, in particular hexanediol. In addition to these alcohols further mono-, di- or polyalcohols may also be present in the alcohol component, for example those having a molecular weight of 62 to 400 g/mol. Examples are monoethylene glycol, 1,2- or 1,3-propanediol, diethylene glycol, dipropylene glycol, glycerol, pentaerythritol or trimethylolpropane.

These dialcohols having 4 to 12 carbon atoms preferably have terminal OH groups. It is particularly preferable when the alcohol component comprises 1,4-butanediol, 1,5-pentanediol, 1,6-hexanediol or 1,10-decanediol, in particular 1,6-hexanediol. The proportion of dialcohols having 4 to 12 carbon atoms based on the alcohol component is preferably 50 to 100 mol %, particularly preferably 70 to 100 mol % and in particular 80 to 98 mol %. A particularly preferred embodiment employs not only the dialcohols having 4 to 12 carbon atoms but also alcohols having a functionality of 3 or more, for example trialcohols, such as glycerol or trimethylolpropane, or quatrols, such as pentaerythritol, to establish a functionality of the polyether (b1) of more than 2.

The polyester alcohol (b1) preferably has a hydroxyl number of 10 to 300, particularly preferably 15 to 250, more preferably 20 to 200, yet more preferably 30 to 150, yet more preferably 40 to 100 and in particular 50 to 80. The number-average molecular weight of the polyester alcohol (b1) is preferably more than 750 g/mol and is more preferably 850 to 5000 g/mol, particularly preferably 1000 to 3000 g/mol and especially 1000 to 2500 g/mol.

The average functionality of the polyesterol (b1) is preferably 1 to 8, more preferably 2 to 6, particularly preferably 2 to 4, more preferably 2 to 3, yet more preferably 2.1 to 2.8 and in particular 2.3 to 2.7. Adjustment of functionality is known. The functionality may thus be adjusted via the proportion of acid having a functionality of more than 2 in the acid component and the proportion of alcohol having a functionality of more than 2 in the alcohol component.

The weight fraction of the polyesterol (b1) based on the total weight of the polymeric compounds having isocyanate-reactive groups (b) is preferably 0.1% to 50% by weight, particularly preferably 1% to 30% by weight, more preferably 2% to 25% by weight, yet more preferably 3% to 20% by weight, yet more preferably 4% to 15% by weight and especially 5% to 10% by weight. In a particularly preferred embodiment of the present invention the component (b) comprises polyetherols, and in a further preferred embodiment no further polyesterols, in addition to the polyesterols (b1).

In a particularly preferred embodiment the content of malonic acid radical of formula —O—C(O)—$CH_2$—C(O)—O— based on the total weight of the polymeric compounds having isocyanate-reactive groups (b) is 0.01% to 30%, more preferably 0.1% to 20%, particularly preferably 0.5% to 15% and in particular 1% to 10% by weight.

Catalysts c) greatly accelerate the reaction of the polyols (b) and optionally chain-extending and crosslinking agents (e) and chemical blowing agents (d) with the organic, optionally modified polyisocyanates (a). The catalysts (c) preferably comprise incorporable amine catalysts.

Typical catalysts employable for production of polyurethanes include for example amidines, such as 2,3-dimethyl-3,4,5,6-tetrahydropyrimidine, tertiary amines, such as triethylamine, tributylamine, dimethylbenzylamine, N-methyl-, N-ethyl- and N-cyclohexylmorpholine, N,N,N',N'-tetramethylethylenediamine, N,N,N',N'-tetramethylbutanediamine, N,N,N',N'-tetramethylethylenediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyl- and N-ethyldiethanolamine and dimethylethanolamine. Likewise contemplated are organic metal compounds, preferably organic tin compounds, such as tin(II) salts of organic carboxylic acids, for example tin(II) acetate, tin(II) octoate, tin(II) ethylhexoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or mixtures thereof. The organic metal compounds may be used either alone or preferably in combination with strongly basic amines. If the component (b) is an ester it is preferable to employ exclusively amine catalysts.

Incorporable amine catalysts have at least one, preferably 1 to 8 and particularly preferably 1 to 2 groups reactive toward isocyanates, such as primary amine groups, secondary amine groups, hydroxyl groups, amides or urea groups, preferably primary amine groups, secondary amine groups, hydroxyl groups. Incorporable amine catalysts are mostly used for production of low-emission polyurethanes especially employed in automobile interiors. Such catalysts are known and described for example in EP1888664. These comprise compounds which, in addition to the isocyanate-reactive group(s), preferably comprise one or more tertiary amino groups. At least one of the tertiary amino groups in the incorporable catalysts preferably bears at least two aliphatic hydrocarbon radicals, preferably having 1 to 10 carbon atoms per radical, particularly preferably having 1 to 6 carbon atoms per radical. It is particularly preferable when the tertiary amino groups bear two radicals independently selected from methyl and ethyl radical plus a further organic radical. Examples of incorporable catalysts that may be used are bis(dimethylaminopropyl)urea, bis(N,N-dimethylaminoethoxyethyl) carbamate, dimethylaminopropylurea, N,N,N-trinnethyl-N-hydroxyethylbis(aminopropylether), N,N,N-trimethyl-N-hydroxyethylbis(aminoethylether), diethylethanolamine, bis(N,N-dimethyl-3-aminopropyl)amine, dimethylaminopropylamine, 3-dinnethylanninopropyl-N, N-dimethylpropane-1,3-diamine, dimethyl-2-(2-aminoethoxyethanol), (1,3-bis(dimethylamino)propan-2-ol), N,N-bis(3-dimethylaminopropyl)-N-isopropanolamine, bis(dimethylaminopropyl)-2-hydroxyethylamine, N,N,N-trinnethyl-N-(3-aminopropyl)-bis(aminoethylether), 1,4-diazabicyclo[2.2.2]octane-2-methanol and 3-dimethylaminoisopropyl diisopropanolamine or mixtures thereof.

Catalysts (c) may be employed for example in a concentration of 0.001 to 5 wt %, in particular 0.05 to 2 wt %, as a catalyst/catalyst combination based on the weight of the component (b). In a particularly preferred embodiment exclusively incorporable catalysts are employed as catalysts (c).

When the polyurethane according to the invention is to be in the form of a polyurethane foam, reaction mixtures according to the invention further comprise blowing agent (d). Any blowing agents known for the production of polyurethanes may be employed. These may comprise chemical and/or physical blowing agents. Such blowing agents are described in, for example, "Kunststoffhandbuch [Plastics Handbook], volume 7, Polyurethane [Polyurethanes]", Carl Hanser Verlag, 3rd edition 1993, chapter 3.4.5. "Chemical blowing agents" is understood to mean compounds that form gaseous products by reaction with isocyanate. Examples of such blowing agents are water or carboxylic acids. "Physical blowing agents" is understood to mean compounds that are dissolved or emulsified in the input materials of polyurethane production and vaporize under the conditions of polyurethane formation. Examples thereof include hydrocarbons, halogenated hydrocarbons and other compounds, for example perfluorinated alkanes such as perfluorohexane, chlorofluorohydrocarbons, and ethers, esters, ketones, acetals and/or liquid carbon dioxide. The blowing agent may be employed in any desired amount. The blowing agent is preferably employed in an amount such that the resulting polyurethane foam has a density of 10 to 850 g/L, particularly preferably 20 to 800 g/L and in particular 25 to 500 g/L. It is particularly preferable to employ blowing agents comprising water.

Employable chain extenders and crosslinkers (e) include compounds having at least two isocyanate-reactive groups and a molecular weight of less than 400 g/mol, wherein molecules having two isocyanate-reactive hydrogen atoms are referred to as chain extenders and molecules having more than two isocyanate-reactive hydrogens are referred to as crosslinkers. It is, however, also possible to omit the chain-extending or crosslinking agents. The addition of chain extenders, crosslinkers or optionally also mixtures thereof may, however, be advantageous in order to modify the mechanical properties, e.g. hardness.

When chain extenders and/or crosslinking agents are to be employed these are typically employed in amounts of 0.5% to 60% by weight, preferably 1% to 40% by weight and particularly preferably 1.5% to 20% by weight in each case based on the total weight of the components (b) to (e).

When chain extenders and/or crosslinkers (e) are employed the chain extenders and/or crosslinkers familiar in the production of polyurethanes may be used. These are preferably low-molecular-weight compounds having isocyanate-reactive functional groups, for example glycerol, trimethylolpropane, glycol and diamines. Further possible low-molecular-weight chain extenders and/or crosslinkers are recited, for example, in "Kunststoffhandbuch, volume 7, Polyurethane", Carl Hanser Verlag, 3rd edition 1993, chapters 3.2 and 3.3.2.

Auxiliaries and/or additives (f) may also be employed. Any auxiliary and additive substances known for the production of polyurethanes may be used. Examples include surface-active substances, foam stabilizers, cell regulators, release agents, fillers, dyes, pigments, flame retardants, hydrolysis stabilizers, fungistatic and bacteriostatic substances and also antioxidants. Such substances are known and described for example in "Kunststoffhandbuch, volume 7, Polyurethane", Carl Hanser Verlag, 3rd edition 1993, chapters 3.4.4 and 3.4.6 to 3.4.11.

Especially the combination of polyesterol (b1) and antioxidants results in a further reduced emission of organic substances, such as aldehydes. Examples of antioxidants are phenolic substances, such as 2,6-di-tert-butyl-4-methylphenol, benzenepropanolic acid, 3,5-bis(1,1-dimethylethyl)-4-hydroxy-C7-C9 branched alkyl esters, aminic antioxidants such as N,N'-di-isopropyl-p-phenylenediamine, thiosynergists, such as dilauryl 5-thiodipropionate, phosphites and phosphonites, such as triphenylphosphites, diphenylalkylphosphites, benzofuranones and indolinones, other antioxidants such as O-, N- and S-benzyl compounds, triazine compounds, amides of β-(3,5-di-tert-butyl-4-hydroxyphenyl)propionic acid, esters of substituted and unsubstituted benzoic acids, nickel compounds and esters of β-10-thiodipropionic acid or a mixture of two or more of these antioxidants. Such antioxidants are described, for example, in WO2017125291 and are commercially available for example under the trade names Irganox 1076, Irganox 245, Irganox 2000, Irganox E201 (vitamin E), Irganox 5057 or Irgafos 38.

Production of the polyurethane according to the invention generally comprises mixing (a) polyisocyanate, (b) polymeric compounds having isocyanate-reactive groups, (c) catalysts and optionally (d) blowing agents, (e) chain extending and/or crosslinking agents and (f) auxiliaries and/or additives to afford a reaction mixture and reacting the reaction mixture to afford the polyurethane. The components (a) to (c) and optionally (d) to (f) are reacted in amounts such that the equivalence ratio of NCO groups of the polyisocyanates (a) to the sum of the reactive hydrogen atoms of the components (b), (c), (d) and optionally (e) and (f) is 0.75 to 1.5:1, preferably 0.8 to 1.25:1. If the cellular plastics at least partially comprise isocyanurate groups, a ratio of NCO groups of the polyisocyanates (a) to the sum of the reactive hydrogen atoms of the components (b), (c), (d) and optionally (e) and (f) of 1.5 to 20:1, preferably 1.5 to 8:1, is typically used. A ratio of 1:1 corresponds to an isocyanate index of 100.

A two-component process is often used, wherein a polyol component (A) and an isocyanate component (B) are mixed and reacted. The isocyanate component (B) and the polyol component (A) are each premixed. The isocyanate component (B) comprises the polyisocyanate (a) and the polyol component (A) typically comprises the polymeric compounds having isocyanate-reactive groups (b), the catalysts (c) and optionally blowing agents (d), chain-extending and/or crosslinking agents (e) and auxiliaries and/or additives (f). Provided a prepolymer is employed as isocyanate component (B), parts of the isocyanate-reactive components, for example selected from the polymeric compounds having isocyanate-reactive groups (b) and/or chain-extending and/or crosslinking agents (e), may also be mixed with the compounds (a-1) to afford the polyisocyanate polymer. Such polyisocyanate prepolymers are described under the polyisocyanates (a). In one embodiment of the invention the polyesterols (b1) are used for producing the isocyanate component (B) so that the polyol component (A) comprises no polyesterols (b1). In a further embodiment of the present invention the polyester alcohols (b1) are partially or preferably completely comprised in the polyol component (A).

The specific starting substances (a) to (f) for producing polyurethanes according to the invention in each case differ quantitatively and qualitatively only to a small extent when the inventive polyurethane to be produced is a thermoplastic polyurethane, a flexible foam, a semi-rigid foam, a rigid foam or an integral foam. Thus, for example, the production of solid polyurethanes employs no blowing agents and the production of thermoplastic polyurethane employs predominantly strictly difunctional starting substances. Furthermore, the elasticity and hardness of the polyurethane according to the invention may be varied for example via the functionality and the chain length of the higher-molecular-weight compound having at least two reactive hydrogen atoms. Such modifications are known to those skilled in the art.

The reactants for producing a solid polyurethane are described for example in EP 0989146 or EP 1460094, the reactants for producing a flexible foam for example in PCT/EP2005/010124 and EP 1529792, the reactants for producing a semi-rigid foam for example in "Kunststoffhandbuch, volume 7, Polyurethane", Carl Hanser Verlag, 3rd edition 1993, chapter 5.4, the reactants for producing a rigid foam for example in PCT/EP2005/010955 and the thermoplastically formable rigid foam for example in EP 2247636 and the reactants for producing an integral foam for example in EP 364854, U.S. Pat. No. 5,506,275 or EP 897402. A portion of the polyols described in these documents is replaced by the polyesterol (b1).

In addition to the process according to the invention the invention further provides a polyurethane obtainable by a process according to the invention.

The emission of organic substances from polyurethanes may also be brought about by the contacting of a reacted or reacting polyurethane with a polyesterol (b1). The polyurethane may be produced in any desired manner and production need not be carried out using the polyesterol (b1). This production is known to those skilled in the art and described in the cited literature. The thus produced polyurethanes are then wetted with the polyesterol (b1), for example by spray application of the polyesterol itself or a solution comprising the polyesterol (b1), for example an aqueous solution. The polyesterol (b1) may also be employed as part of a mold release agent and may be applied directly to the resulting polyurethane after coating of the mold. The amount of polyesterol (b1) to be applied is typically 0.1% to 20% by weight, particularly preferably 1% to 15% by weight, more preferably 1.5% to 10% by weight, yet more preferably 2% to 6% by weight, in each case based on the total weight of the polyurethane without polyesterol (b1). The present invention further provides such a polyurethane.

The polyurethanes according to the invention are preferably used in enclosed spaces, for example as thermal insulation materials in residential buildings, such as insulation for pipes and refrigerators, in furniture construction, for example as decorative elements or as seat cushions, as mattresses and in the interior of vehicles, for example in automobile interiors, for example as steering wheels, dashboards, door trims, carpet foam backings, acoustic foams, such as headliners, and also headrests or gear knobs. For polyurethanes according to the invention both the formaldehyde and acetaldehyde emissions are markedly reduced not only compared to a reference product without an additive but also compared to prior art additives for aldehyde reduction. Polyurethanes according to the invention further emit only very small amounts of volatile organic compounds (VOC) according to VDA 278 and TVOC according to VDA 277. The compounds (b1) are thermally stable. As a result this compound does not lose activity even at reaction temperatures of up to 200° C. that may occur in the production of certain polyurethane foams. The polyester alcohols (b1) are also storage stable especially in customary polyol components which may typically comprise not only the polymeric compounds having isocyanate-reactive groups (b) but also catalysts (c) and, if present, blowing agents, in particular blowing agents comprising water, (d), chain-extending and/or crosslinking agents (e) and auxiliaries and/or additives (f). In the context of the present invention storage stability is to be understood as meaning that after storage in a sealed container at room temperature the cream and rise times in the beaker test at room temperature are altered by not more than 50%, preferably 30% and in particular 20% compared to the time of mixing to afford the polyol component. Storage stability is preferably more than one week, particularly preferably more than 4 weeks and especially more than 3 months.

The polyesterol (b1) may further be used as an adhesion promoter to improve the adhesion of a polyurethane according to the invention to a plastic. The present invention thus also relates to a composite element comprising a plastic to which the polyurethane according to the invention is adhesively bonded, wherein the composite element is obtainable by applying the polyurethane reaction mixture according to the invention to a plastic and reacting it to afford the polyurethane on the plastic.

The composite elements according to the invention comprising polyurethane according to the invention and plastic may comprise for example thermosets or thermoplastics as the plastic. It is preferable to employ thermoplastic. Customary thermoplastics comprise for example polyphenylene oxide (PPO), polyvinyl chloride (PVC), acrylonitrile butadiene styrene (ABS), polymethyl methacrylate (PMMA), acrylonitrile styrene acrylic ester (ASA), polycarbonate (PC), thermoplastic polyurethane (TPU), polyethylene (PE), polypropylene (PP). The composite elements preferably comprise as plastic (i) thermoplastic polyolefins (TPO) such as polyethylene and/or polypropylene, polyvinyl chloride (PVC), styrene maleic anhydride (SMA) and/or a polycarbonate/styrene-acrylonitrile/acrylonitrile-butadiene blend (PC/ABS), preferably in the form of films, sheets or as a cable material.

The plastics (i) may be employed in the form of customary materials for production of the composite elements, for example as sheets or films, generally having a thickness of 0.2 to 2 mm.

Such films are commercially available and the production thereof is well known. The films preferably have a thickness of 0.2 to 2 mm. Also employable as (i) are films comprising at least two layers, wherein for example one layer comprises an ASA and/or polycarbonate material.

Plastics further comprise all customary plastics-based materials typically used for insulation of electrical conductors. These comprise polyvinylchloride (PVC), thermoplastic polyurethane (TPU), polypropylene (PP) and ethylene tetrafluoroethylene (ETFE).

The plastics composed of styrene maleic anhydride (SMA) and/or a polycarbonate/styrene-acrylonitrile/acrylonitrile-butadiene blend (PC/ABS) may be used in the form of customary materials to produce the composite elements, for example as a stiffening part for instrument panels or door trim parts. Skin materials for said application are often made of thermoplastic polyolefins (TPO) and polyvinyl chloride (PVC).

When used as an adhesion promoter the polyester (b1) preferably has a hydroxyl number of 30 to 100, preferably 40 to 90 and particularly preferably 50 to 75 mg KOH/g. The proportion of the adhesion promoter is preferably 0.1% to 15% by weight, particularly preferably 0.5% to 10% by weight and in particular 1% to 5% by weight based on the total weight of the compound having isocyanate-reactive groups (b).

Production of the composite elements according to the invention is carried out by contacting the reaction mixture for producing the polyurethane according to the invention with the plastic, typically without the use of further adhesion-generating materials, such as adhesives. The plastic and the reaction mixture for producing the polyurethane according to the invention are preferably contacted with one another, for example in a mold. Production of the polyurethanes, for example of the flexible foams, semi-rigid foams or integral foams, particularly preferably of the semi-rigid foams and integral foams, is otherwise carried out according to well-known processes, for example the one-shot process, with well-known tools, molds, mixing apparatuses and dosing means.

The composite elements according to the invention exhibit in particular a markedly improved adhesion between the plastic and the polyurethane due to the use of the polyester polyol (b1). This adhesion may be determined in different ways, for example by measuring the force required for detachment of the plastic. In the case of sheetlike bonded composites a peel force between the plastic and the polyurethane according to DIN 53289 or 53530 of 2.5 N/cm or more is preferably achieved both in the new state and after hot and hot/humid storage. Adhesion may also be determined according to subjective assessment criteria. In cable sheathing and grommets longitudinal watertightness is only ensured when there is adhesion between the plastic and the polyurethane. This is tested for example according to internal specifications from DELPHI (REI-WDP 1), internal specifications from Ford (WSS-M15P45-A: FLTM-BI 104-01) or according to a standard from PSA-Peugeot-Citroen (B21 7050). A water column is placed on one side of the grommet; should moisture be measurable on the other side of the grommet the specimen fails (F). The permeability of cable sheathings is furthermore sometimes assessed by performing tests with elevated air pressure and measuring the pressure drop.

The composite elements according to the invention are preferably used as components in vehicle or aircraft manufacture or buildings construction, for example as dashboards, door trim, parcel shelves, consoles, armrests or door mirrors. The composite elements according to the invention are further employed in the sheathing of electrical conductors. This includes not only the production of dimensionally stable foamed cable sets but also the production of grommets, connectors and relay potting. The polyurethane is preferably in foamed form in products in vehicle or aircraft manufacture and buildings construction and in the insulation of electrical conductors. In the case of connectors and relay potting the polyurethane is preferably in compact form.

The invention shall be elucidated hereinbelow with reference to examples.

Starting Materials

Polyol A: Glycerol-started polyether polyol based on ethylene oxide and propylene oxide having an average OH number of 28 mg KOH/g, a functionality of 2.7 and a propylene oxide content based on the total weight of the polyether of 84 wt %.

Polyol B: Polyether polyol having an OH number of 250 mg KOH/g and a functionality of 2.0 based on polyol A (35% by weight), propylene oxide (45% by weight) and dimethylaminopropylamine (20% by weight).

Polyol C: Polyetherol having an OH number of 490 mg KOH/g and a functionality of 4.3 based on sucrose, glycerol and propylene oxide, a sucrose content of 20% by weight, a glycerol content of 13% and a propylene oxide content of 67% by weight.

Isocyanate A: Mixture of 85% by weight of carbodiimide-modified 4,4'-MDI and 15% by weight of polymeric diphenylmethane diisocyanate (PMDI) having an NCO content of 29.8% by weight.

TEOA: Triethanolamine

Isopur SU-12021: Black color paste from ISL-Chemie

Jeffcat DPA: Catalyst from Huntsman

Jeffcat ZF10: Catalyst from Huntsman

Additives

V1: Trimethylolpropane triacetoacetate

V2: Reaction product of malonic acid and diethylene glycol (2:3, Mw 458 g/mol)

V3: Esterification product of 1 mol of polyol C with 4 mol of methyl acetoacetate V4: Polyester polyol composed of adipic acid, 1,4-butanediol, isophthalic acid, monoethylene glycol having an average OH number of 55 mg KOH/g.

A1: Polyester polyol composed of diethyl malonate, adipic acid (mole ratio 4:1), 1,6-hexanediol and glycerol having an average OH number of 70 mg KOH/g.

A2: Polyester polyol composed of diethyl malonate, 1,6-hexanediol and glycerol having an average OH number of 71 mg KOH/g.

A3: Polyester polyol composed of diethyl malonate, adipic acid (mole ratio 4:1) and 1,6-hexanediol having an average OH number of 58 mg KOH/g.

A4: Polyester polyol composed of diethyl malonate and 1,6-hexanediol having an average OH number of 56 KOH/g.

Synthesis of Additives A1 to A4

Synthesis of A1

142.29 g of adipic acid, 0.01 g of TTB (titanium(IV) butoxide CAS: 5593-70-4), 23.02 g of glycerol and 604.87 g of 1,6-hexanediol are initially charged into a 4 l round-necked flask fitted with a thermometer, nitrogen inlet, heating mantle, distillation column and stirrer and heated to 120° C. Once the acid has fully melted the temperature is increased stepwise to 240° C. and the water is distilled off at 240° C. over several hours. After 4 h the acid number is 0.1 mg KOH/g and the reaction mixture is cooled to 150° C. 623.79 g of diethyl malonate are added and the reaction temperature is increased stepwise to 180° C. After 8 hours a further 19 g of diethyl malonate are added and the batch is stirred at 180° C. for a further 6 h. A further 6.9 g of diethyl malonate are added and ethanol is distilled off at 180° C. for a further 2 hours. The batch is cooled and stabilized with 1.5 g of Irganox 1076. A colorless polyester polyol having a hydroxyl number of 70.3 mg KOH/g, an acid number <0.1 mg KOH/g and a viscosity of 5118 mPas at 25° C. is obtained.

Synthesis of A2:

855.74 g of diethyl malonate, 630.87 g of 1,6-hexanediol, 23.02 g of glycerol and 0.01 g of TTB (titanium (IV) butoxide CAS: 5593-70-4) are initially charged into a 4 l round-necked flask fitted with a thermometer, nitrogen inlet, heating mantle, distillation column and stirrer. The temperature is increased stepwise to 160° C. Ethanol is distilled off at 160° C. for 7 hours. A further 50 g of diethyl malonate are subsequently added and the reaction mixture is boiled at 160° C. for 7 h. The product is stabilized with 1.5 g of Irganox 1076. A colorless polyester polyol having a hydroxyl number of 71 mg KOH/g, an acid number <0.1 mg KOH/g and a viscosity of 3114 mPas at 25° C. is obtained.

Synthesis of A3

141.31 g of adipic acid, 0.01 g of TTB (titanium(IV) butoxide CAS: 5593-70-4) and 630.45 g of 1,6-hexanediol are initially charged into a 4 l round-necked flask fitted with a thermometer, nitrogen inlet, heating mantle, distillation column and stirrer and heated to 120° C. Once the acid has fully melted the temperature is increased stepwise to 240° C. and the water is distilled off at 240° C. over several hours. After 5 h the acid number is 0.1 mg KOH/g and the reaction mixture is cooled to 150° C. 619.50 g of diethyl malonate are added and the reaction temperature is increased stepwise to 180° C. After 11 hours a further 16.5 g of diethyl malonate are added and the batch is stirred at 180° C. for a further 3 h. The batch is cooled and stabilized with 1.50 g of Irganox 1076. A colorless polyester polyol having a hydroxyl number of 57.7 mg KOH/g, an acid number <0.1 mg KOH/g and a viscosity of 4698 mPas at 25° C. is obtained.

Synthesis of A4

809.37 g of diethyl malonate, 656.28 g of 1,6-hexanediol and 0.01 g of TTB (titanium (IV) butoxide CAS: 5593-70-4) are initially charged into a 4 l round-necked flask fitted with a thermometer, nitrogen inlet, heating mantle, distillation column and stirrer. The temperature is increased stepwise to 160° C. Ethanol is distilled off at 160° C. for 4 hours. A further 50 g of diethyl malonate are subsequently added and the reaction mixture is boiled at 160° C. for 5 h. The product is stabilized with 1.5 g of Irganox 1076. A colorless polyester polyol having a hydroxyl number of 56.1 mg KOH/g, an acid number <0.1 mg KOH/g and a viscosity of 3338 mPas at 25° C. is obtained.

Methods

Viscosity determination: Unless otherwise stated the viscosity of the polyols was determined at 25° C. according to DIN EN ISO 3219 (1994) with a Rheotec RC 20 rotational viscometer using a CC 25 DIN spindle (spindle diameter: 12.5 mm; measuring cylinder inner diameter: 13.56 mm) at a shear rate of 50 1/s.

Measurement of hydroxyl number: Hydroxyl numbers were determined by the phthalic anhydride method DIN 53240 (1971-12) and reported in mg KOH/g.

Measurement of acid number: Acid number was determined to DIN EN 1241 (1998-05) and is reported in mg KOH/g.

Formaldehyde was determined by a procedure analogous to ASTM D-5116-06. The chamber size was 4.7 liters. The polyurethane samples used were pieces of 110 mm×100 mm×25 mm in size from the interior of the foam. The temperature in the measuring chamber during the measurement was 65° C., the relative humidity 50%. The air change rate was 3.0 liters per hour. The exhaust air stream comprising volatile aldehydes from the polyurethane was passed through a cartridge comprising silica coated with 2,4-dinitrophenylhydrazine over 120 minutes. The DNPH cartridge was then eluted with a mixture of acetonitrile and water. The concentration of formaldehyde in the eluate was determined by HPLC. In this setup the limit of detection for formaldehyde emissions is ≤11 µg/m³.

TVOC was determined by a procedure according to VDA 277.

To investigate adhesion, test specimens were produced as described above and a PVC film (test film, 0.42 mm, Benecke-Kaliko, Germany) was placed in the mold. Adhesion was assessed using a subjective test method one hour after production. This was done by peeling the PVC film off the polyurethane sheet and evaluating adhesion using an evaluation scale from 1 to 5.

Scale Definition:
5 Adhesive fracture, no adhesion
4 Cohesive fracture, PVC film easy to remove from polyurethane sheet
3 Cohesive fracture, PVC film removable from polyurethane sheet
2 Cohesive fracture, PVC film difficult to remove from polyurethane sheet
1 Cohesive fracture, PVC film very difficult to remove from the polyurethane sheet An evaluation of 1-2 generally corresponds to an adhesive force sufficient for example for automotive applications.

GENERAL PRODUCTION EXAMPLE

Mixture A was produced by mixing the following components:
87.1 parts by weight of polyol A
3.0 parts by weight of polyol B
1.5 parts by weight of TEOA
0.5 parts by weight of Isopur SU-12021
2.3 parts by weight of water
0.4 parts by weight of Jeffcat DPA
0.2 parts by weight of Jeffcat ZF10
0.5 or 5 parts by weight of compounds V1-V4 and A1-A4 according to Table 1.

The mixture A and the isocyanate A and the additives according to Table 1 were mixed with one another at an isocyanate index of 100 and added to a closed mold to afford moldings having an average density of 160 g/L.

Properties

Table 1 shows the values for TVOC according to VDA 277, for formaldehyde emissions and also the influence of polyesterol (b1) on reaction times after storage and also adhesion:

TABLE 1

|  | Parts by weight in A | VDA 277 TVOC (ppm) | Formaldehyde (µg/m³) | Cream time/full rise time after storage for one week at 50° C. | | Adhesion |
|---|---|---|---|---|---|---|
| Reference | — | 10 | 676 | 11 | 60 | 5 |
| V1 | 0.5 | 123 | 64 | 11 | 60 | 5 |
| V1 | 5 | 1754 | n.m. | 12 | 64 | 4 |
| V2 | 0.5 | 15 | 198 | 13 | 70 | 5 |
| V2 | 5 | 83 | 14 | 32 | 150 | 5 |
| V3 | 0.5 | 104 | 105 | 12 | 60 | 4 |
| V3 | 5 | 1603 | n.m. | 12 | 60 | 4 |
| V4 | 5 | 8 | 660 | 10 | 60 | 1 |
| A1 | 5 | 10 | 58 | 10 | 62 | 1 |
| A2 | 5 | n.m. | 36 | 11 | 62 | 1 |
| A3 | 5 | 9 | 62 | 11 | 60 | 1 |
| A4 | 5 | 8 | 43 | 11 | 61 | 2 |

Table 1 shows that the additives V1 to V3 of the comparative tests markedly reduce the formaldehyde emissions while, by contrast, the TVOC emissions according to VDA 277 are markedly elevated compared to the reference (n.m. stands for "not measured"). Compound V4 results in good adhesion and shows low emissions according to VDA 277 but formaldehyde emissions are in the reference range. By contrast, the inventive compounds A1 to A4 show a marked reduction not only in formaldehyde emissions but also in emissions according to VDA 277. These values of less than 20 ppm are below the maximum values demanded in the automotive manufacturing sector. The compounds A1 to A4 likewise have essentially no effect on cream and rise times after a week of storage of the mixture A at 50° C. while comparative compound V2 in particular results in markedly elevated values. Furthermore, the examples using the inventive polyesterols (b1) show very good adhesion to a PVC film.

The invention claimed is:

1. A process for producing polyurethanes comprising:
mixing
(a) polyisocyanate,
(b) polymeric compounds having isocyanate-reactive groups,
(c) catalysts, and optionally
(d) blowing agents,
(e) chain-extending and/or crosslinking agents, and
(f) auxiliary and/or additive substances
to afford a reaction mixture, and
reacting the reaction mixture to afford a polyurethane,
wherein the polymeric compounds having isocyanate-reactive groups (b) comprise a polyesterol (b1) obtainable by polycondensation of an acid component with an alcohol component, wherein the acid component comprises malonic acid and/or derivatives thereof and the alcohol component comprises an aliphatic dialcohol selected from butanediol, pentanediol, hexanediol, decanediol, or mixtures thereof; and wherein a weight fraction of the polyesterol (b1) based on a total weight of the polymeric compounds having isocyanate-reactive groups (b) is 0.1% to 50% by weight.

2. The process according to claim 1, wherein in addition to malonic acid and/or derivatives thereof the acid component comprises one or more further dicarboxylic acids having 6 to 12 carbon atoms or derivatives thereof.

3. The process according to claim 1, wherein a content of malonic acid and/or malonic acid derivative based on a total content of the acid component is 20 to 100 mol %.

4. The process according to claim 1, wherein a number-average molecular weight of the polyesterol (b1) is greater than 750 g/mol.

5. The process according to claim 1, wherein an average functionality of the polyesterol (b1) is 1 to 8.

6. The process according to claim 1, wherein a hydroxyl number of the polyesterol (b1) is 10 to 300.

7. The process according to claim 1, wherein the polymeric compounds having isocyanate-reactive groups (b) comprise polyetherols.

8. The process according to claim 1, wherein the catalysts (c) comprise incorporable amine catalysts having isocyanate-reactive group(s), wherein the incorporable amine catalysts comprise one or more tertiary aliphatic amino groups.

9. A polyurethane obtainable according to claim 1.

10. The polyurethane according to claim 9, wherein the polyurethane is an automotive interior part.

11. The process according to claim 1, wherein the polyurethane is part of a composite element comprising a plastic to which the polyurethane is adhesively bonded, wherein the composite element is obtainable by applying the polyurethane reaction mixture to the plastic and reacting the reaction mixture to afford the polyurethane on the plastic.

12. The process according to claim 11, wherein the plastic is a thermoplastic.

* * * * *